US012145719B2

(12) United States Patent
Perrelli et al.

(10) Patent No.: US 12,145,719 B2
(45) Date of Patent: Nov. 19, 2024

(54) HYDRAULIC ACTUATOR INCLUDING A MULTI-HEAD PISTON FOR HYDRAULIC GEARING

(71) Applicant: Hamilton Sundstrand Corporation, Charlotte, NC (US)

(72) Inventors: Frank Perrelli, East Haven, CT (US); Morgan O'Rorke, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 165 days.

(21) Appl. No.: 17/727,004

(22) Filed: Apr. 22, 2022

(65) Prior Publication Data

US 2023/0339605 A1 Oct. 26, 2023

(51) Int. Cl.
*B64C 25/22* (2006.01)
*B64C 13/50* (2006.01)
(Continued)

(52) U.S. Cl.
CPC ............ *B64C 25/22* (2013.01); *B64C 13/504* (2018.01); *F15B 1/26* (2013.01); *F15B 7/006* (2013.01); *F15B 21/0427* (2019.01); *F15B 2211/20515* (2013.01); *F15B 2211/20538* (2013.01); *F15B 2211/20561* (2013.01); *F15B 2211/27* (2013.01); *F15B 2211/3058* (2013.01); *F15B 2211/411* (2013.01); *F15B 2211/4159* (2013.01); *F15B 2211/6343* (2013.01);
(Continued)

(58) Field of Classification Search
CPC .............................. F15B 11/0365; B64C 13/40
See application file for complete search history.

(56) References Cited

U.S. PATENT DOCUMENTS

| | | | |
|---|---|---|---|
| 4,286,929 A * | 9/1981 | Heath | F04B 9/133 417/404 |
| 4,761,118 A | 8/1988 | Zanarini | |

(Continued)

FOREIGN PATENT DOCUMENTS

| | | |
|---|---|---|
| DE | 1301250 B | 8/1969 |
| DE | 3803009 A1 | 9/1988 |

OTHER PUBLICATIONS

European Search Report for Application No. 23169582.6, mailed Sep. 14, 2023, 7 pages.

*Primary Examiner* — Thomas E Lazo
(74) *Attorney, Agent, or Firm* — CANTOR COLBURN LLP

(57) ABSTRACT

A hydraulic actuator system includes a hydraulic actuator having a housing with a piston having a piston shaft arranged within the housing. The housing is formed to have first, second and third regions, wherein the first region is between the second and third regions and has a larger major dimension than the second and third regions. The system also includes first, second, and third piston heads connected to the piston shaft with the first piston head being tween the second and third piston, wherein the first position head is within the first region and divides the first region into two volumes, the second piston head is in the second region and defines a first volume and the third piston head is in the third region and defines a fourth volume. The system also includes a mode selection device operably connected to the first, second, third and fourth volume.

14 Claims, 4 Drawing Sheets

(51) Int. Cl.
*F15B 1/26* (2006.01)
*F15B 7/00* (2006.01)
*F15B 21/0427* (2019.01)

(52) U.S. Cl.
CPC ................. *F15B 2211/6651* (2013.01); *F15B 2211/8752* (2013.01)

(56) References Cited

U.S. PATENT DOCUMENTS

| | | | |
|---|---|---|---|
| 5,558,000 A | 9/1996 | Sawamura | |
| 7,637,516 B2 | 12/2009 | Mizuno et al. | |
| 8,161,741 B2 | 4/2012 | Ingersoll et al. | |
| 10,059,434 B2 | 8/2018 | To | |
| 10,786,845 B2 * | 9/2020 | Vulcan | F15B 11/0365 |
| 2018/0022442 A1 * | 1/2018 | Blanc | F15B 11/10 |
| | | | 91/459 |
| 2021/0139134 A1 * | 5/2021 | Atkins | B64C 27/605 |

* cited by examiner

HYDRAULIC ACTUATOR INCLUDING A MULTI-HEAD PISTON FOR HYDRAULIC GEARING

BACKGROUND

The following description relates to hydraulic actuators and, more particularly, to a hydraulic actuator system that includes an actuator with multiple piston heads.

Hydraulic actuators find many applications, particularly in controlling movement of a moveable component. In aircraft, many moveable components and surfaces are moved by means of a hydraulic actuator. In general terms, a hydraulic actuator comprises a cylindrical housing in which is mounted an axially moveable piston rod. A head of the rod, inside the housing, divides the housing into two chambers each having a fluid port via which pressurized fluid can be injected into the chamber or low-pressure fluid exits the chamber, so as to change the relative pressure in the two chambers either side of the piston head, thus causing movement of the piston relative to the housing. A free end of the piston rod that extends out of the housing is attached to a component or surface to be moved.

Hydraulic fluid is provided to the actuator, from a hydraulic fluid supply in fluid communication with the interior of the actuator housing via the ports in the housing, to cause the piston rod to extend out of the housing, or hydraulic fluid is withdrawn from the housing to cause the piston rod to retract back into the housing. The movement of the piston rod is determined by the direction or and pressure of the fluid applied to the actuator, which is in response to a control signal. As the piston rod moves relative to the housing, the moveable component or surface to which it is attached will move accordingly.

To allow both extension of the rod and retraction of the rod, a valve is provided to set the movement to extension or retraction. This may be a servovalve, more specifically an electrohydraulic servovalve (EHSV). The value is positioned between the hydraulic fluid supply and the actuator and is moveable, in response to an electric control signal, between a first position in which high pressure fluid flows from the supply into one chamber of the actuator housing and low pressure fluid exits from the other chamber, and a second position in which high pressure fluid is injected into the other chamber and withdrawn from the first chamber of the actuator housing. The valve may also have a neutral or closed position in which fluid is neither supplied to nor withdrawn from the actuator housing.

BRIEF DESCRIPTION

According to some aspects of the present disclosure, a hydraulic actuator system of an aircraft is disclosed. The actuator system includes a hydraulic actuator having a housing with a piston having a piston shaft arranged within the housing. The housing is formed to have first, second and third regions, wherein the first region is between the second and third regions and has a larger major dimension than the second and third regions. The system also includes First, second, and third piston heads connected to piston shaft with the first piston head being tween the second and third piston, wherein the first position head is within the first region and divides the first region into two volumes, the second piston head is in the second region and defines a first volume and the third piston head is in the third region and defines a fourth volume and a mode selection device operably connected to the first, second, third and fourth volume. In a first mode the mode selection device connects the second volume to the third volume and in a second mode the mode selection device connects the first volume to the second volume and connects the third volume to the fourth volume.

In addition to one or more of the features described above, or as an alternative to any of the foregoing embodiments, the first, second and third regions are cylindrical.

In addition to one or more of the features described above, or as an alternative to any of the foregoing embodiments, the first region has a first diameter and second region and third regions have a second diameter that is smaller than the first diameter.

In addition to one or more of the features described above, or as an alternative to any of the foregoing embodiments, the system can also include an extend line fluidly connected to the second region and a retract line fluidly connected to the third region.

In addition to one or more of the features described above, or as an alternative to any of the foregoing embodiments, when in the second mode the second volume is fluidly connected to the extend line and the third volume is fluidly connected to the retract line.

In addition to one or more of the features described above, or as an alternative to any of the foregoing embodiments, the system can also include: a control element connected to high pressure source and a low pressure source. The control element selectively couples the high pressure source to the extend line to extend the piston and to the retract line to retract the piston.

In addition to one or more of the features described above, or as an alternative to any of the foregoing embodiments, the control element selectively couples the low pressure source to the extend line to retract the piston and to the retract line to extend the piston.

In addition to one or more of the features described above, or as an alternative to any of the foregoing embodiments, the control element is an electrohydraulic servovalve.

In addition to one or more of the features described above, or as an alternative to any of the foregoing embodiments, further comprising an aircraft system, wherein the piston is configured to actuate a component of the aircraft system.

Also disclosed is a method of operating a actuator system onboard an aircraft. The method includes providing any system disclosed above or otherwise herein; causing the mode selection device to operate in the first mode to move the piston at a first speed and first force; and causing the mode selector to operate in the second mode to move the piston with a second force that is greater than the first force.

In addition to one or more of the features described above, or as an alternative to any of the foregoing embodiments, wherein when in the second mode, the piston moves at a second speed that is slower than the first speed.

The method can include connecting the piston to actuate a component of an aircraft system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

When designing an actuator and EHSV for a system the performance sizing factors are typically required slew rate, and load capabilities. Greater loads will require a piston diameter larger, and larger piston diameter require larger EHSVs to meet slew rate requirements, which typically come with high leakages, stability issues across large ranges of pressures, and increased envelope size.

If the max load conditions does not coincide with the fastest slew rate requirements there is an opportunity to tune the design for both faster slews where needed and greater loads where needed.

As will be described below, provided herein is an actuator that includes three piston heads. The heads include a large head and at least two smaller heads that are disposed on opposite sides of the large head. The small diameter heads allow for fast slew rates at lower force outputs with low flow and the larger diameter head allows for greater force output at a reduced slew rate with the same flow. With the inclusion of a mode selection element (e.g., a switching solenoid or EHSV) the actuator can operate thus operate in two different modes, a high speed mode and high power output mode.

Figure 1:
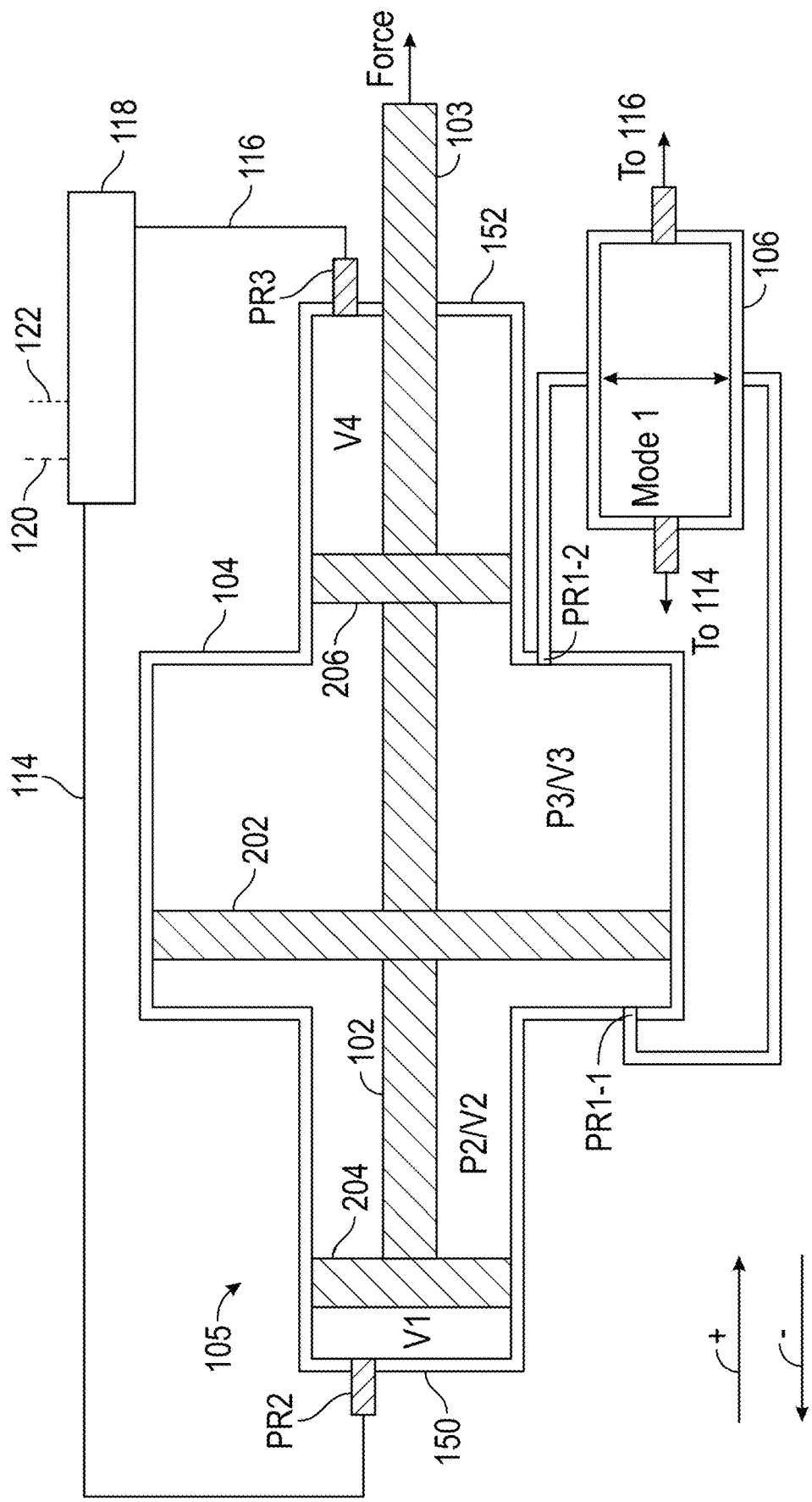
FIG. 1 shows an example of an actuation system configured in a first mode.

Referring to FIG. 1 is a schematic illustration of an actuator system 100 in accordance with an embodiment of the present disclosure are shown. The actuator system 100 may be used onboard aircraft to perform an actuating operation of through actuation or movement of a piston 102 within a housing 104. The combination of the housing and piston may be referred to as actuating element 105 that in combination with the mode selection device 106 can define an actuator herein.

The piston 102 includes multiple piston heads as more fully explained below. Regardless of the operation mode of the system, the piston 102 is configured to move either in the positive or negative direction (see arrows +/−) based on pressure on different sides of the piston heads. Based on configuration, force provided by the piston can be either direction A or direction B. The amount of force provided will depend at least in part on the mode of operation that the system is operating in.

The piston 102 includes a first piston head 202 that has a first diameter. The piston 102 also includes two smaller piston heads 204, 206 that are disposed on opposing sides of the first piston head 202. The smaller piston heads can be referred to as second and third piston heads 204, 206 herein from time to time. The major axis, side or diameter of the first (or larger) piston head 202 is greater than both the major axis, side or diameter of the second and third piston heads 204, 206 in one embodiment. The second and third piston heads 204, 206 can have the same or substantially the same dimensions in one embodiment.

All piston heads 202, 204, 206 are shown as being connected to single shaft 103. The shaft 103 can be connected to a movable element (not shown) such a flap or other aerodynamic surface of an aircraft and can cause it to move. It shall be understood that the shaft could be segmented one embodiment.

Figure 2:
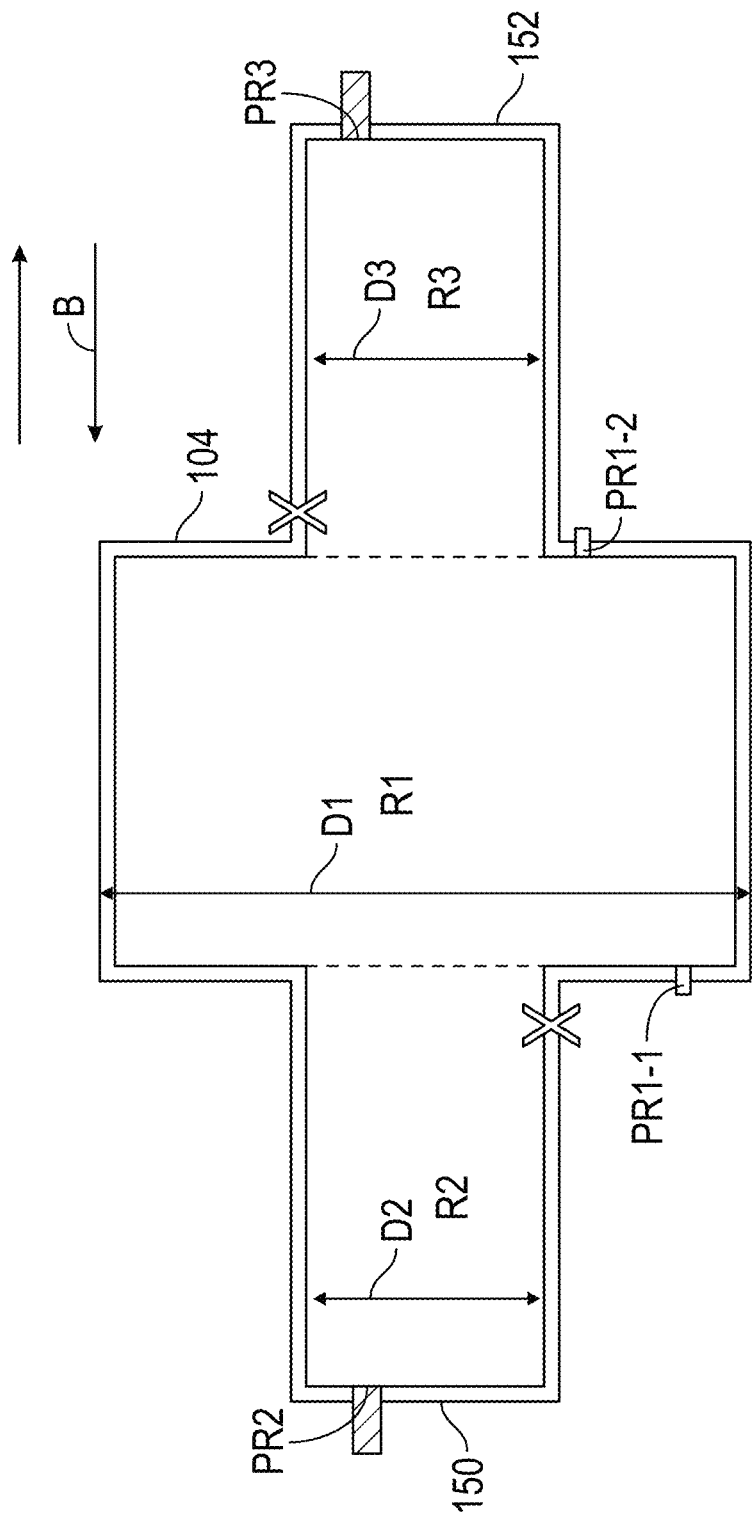
FIG. 2 shows the housing of the system of FIG. 1 and defines certain regions therein.

With additional reference now to FIG. 2, the housing 104 can be arranged and configured such that it defines three regions, R1, R2, R3. The regions R1, R2, R3 can be cylindrical in shape in one embodiment. In such an embodiment, the R1, R2, R3 have respective diameters D1, D2 and D3. Of course, in other cases, the regions could be, for example, square/rectangular and D1, D2 and D3 could refer a side length or major axis. In such a case, rather than being round in shape, the piston heads could match the shape of the region. As illustrated, D1 is greater than D2 and D3. In one embodiment, D2 and D3 are the same or similar.

In operation, each region R1, R2 and R3 will have respective piston heads 202, 204, 206 disposed within them. As such, the piston heads 202, 204, 206 will also be sized such that are the same or approximately the same (to allow for some sliding) as the region in which it is located. Thus, piston heads 202, 204, 206 will have diameters (or side lengths) of D1, D2 and D3, respectively, in the case where each region is cylindrical. The skilled artisan should understand the relationship between D1, D2 and D3 as applied to the regions R1, R2, R3 and the piston heads 202, 204, 206 and may apply flanges or other elements around the piston heads so the actuating element 105 operates as intended and fluid cannot easily pass around each piston head 202, 204, 206.

Figure 3:
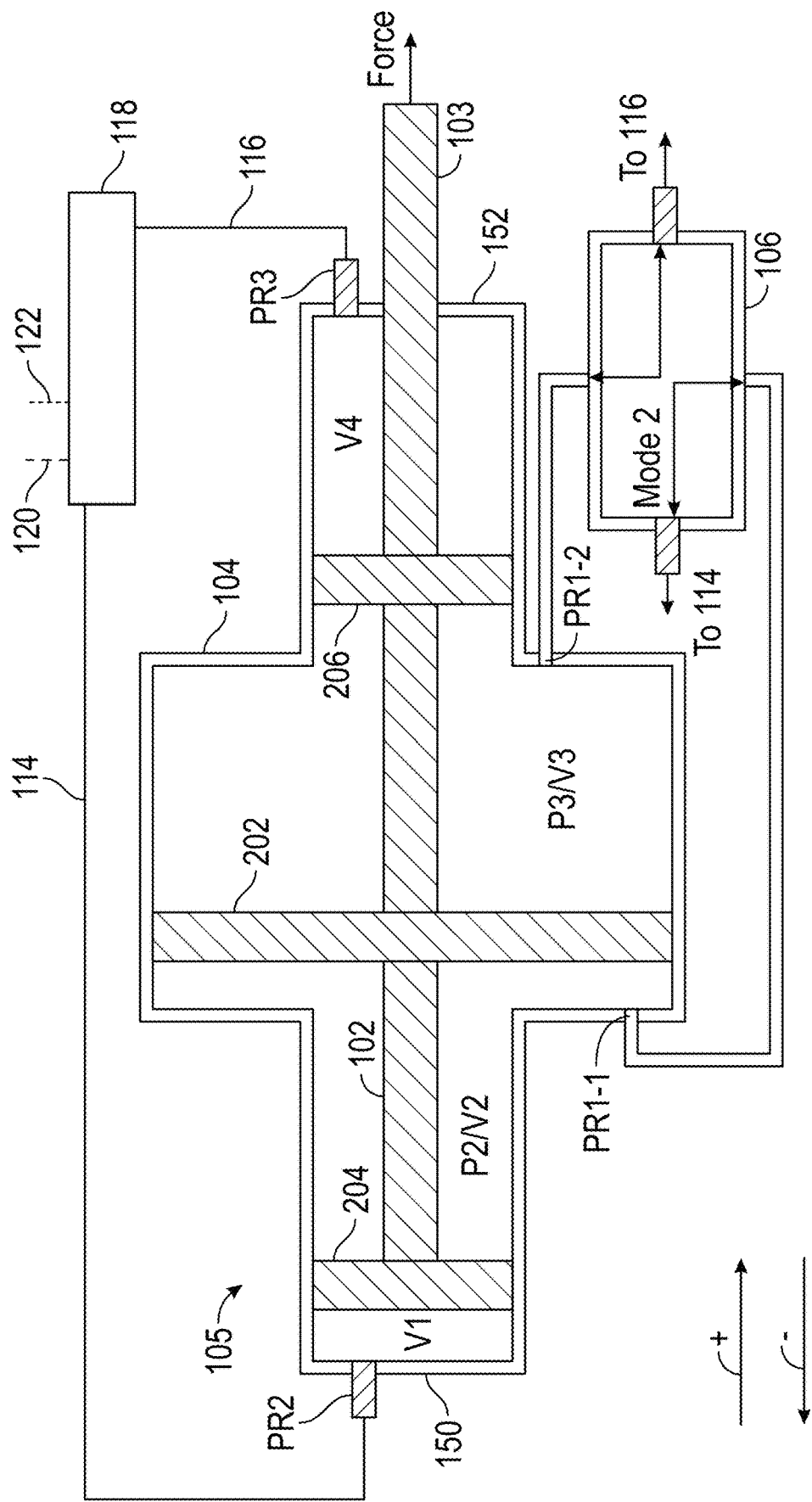
FIG. 3 shows an example of an actuation system configured in a second mode.

The housing 104 has a first end 150 and a second end 152. As shown in FIGS. 1 and 3, the second piston head 204 defines a movable volume V1 between it and the first end 150. A second volume V2 is defined within housing 104 and is between the second piston head 204 and the first piston head 202. A third volume V3 is defined within housing 104 and is between the third piston head 206 and the first piston head 202. As the piston 102 moves, V2 can be formed within both R1 and R2 and V3 can be formed within in both R2 and R3 to varying degrees. The third piston head 206 similar defines a movable volume V4 between it and the second end 152.

The housing 104 also includes multiple input/output ports. These ports allow for fluid to be provided into the housing from, for example, high and low pressure lines. Herein, the second region R2 and the third region R3 include, respectively, ports PR2 and PR3. The housing 104 also includes two additional ports that are arranged such they can be in fluid communication with the first region R1. As shown, these ports PR1-1 and PR1-2 are directly connected to the first region R1. However, the exact location can be moved as long as the ports PR1-1 and PR1-2 provide fluid on opposing sides of the first piston head 202 and between the second and third piston heads 204, 206. Thus, the ports PR1-1 and PR1-2 could alternatively be, for example, located where the X's are shown in FIG. 2.

In a typical actuator system, the piston would have a single piston head that divides the housing into a retract chamber and an extend chamber on opposite sides of a piston head. These chambers are connected to high and low pressure fluid sources by an EHSV.

As shown in FIG. 1, the system 100 includes a control element 118 (e.g. EHSV) that is operably connected to a high pressure line 120 and a low pressure line 122 for the purpose of controlling the amount or level of pressure in the chambers/volumes defined in the housing 104 by the piston heads 202, 204 and 206. The control element 118 is connected to extend supply line 114 and retract supply line 116 and can selectively connect high pressure line 120 and low pressure line 120 to them.

To move the piston 102 to right in the example of FIG. 1, high pressure line 120 is connected to extend supply line 114 and low pressure line 122 is connected to retract pressure line 116. To move the piston to the left in the example of FIG. 1, high pressure line 120 is connected to retract supply line 116 and low pressure line 122 is connected to the extend supply line 114. In this manner, the control element 118 can cause translational movement of the piston 102 relative to the housing 106 and thus control an extension or retraction of the shaft 102.

As shown in FIG. 1, the system 100 is configured in a first mode. In the first mode, the mode selection device 106 is in a first position. In this position, the mode selection device fluidly connects the ports PR1-1 and PR1-2. As such, as the piston 102 moves fluid from V3 can move into V2 and vice versa. In general, the connection via the mode selection device 106 results balanced pressure on opposing sides of the first piston head 202, and, in essence, removes the first piston head 202 from having an appreciable affect on the operation of the actuating element.

Herein, each mode will have different retract and extend chambers. For example, in a first mode shown in FIG. 1, the extend chamber is the movable volume V1 between defined between the first head 204 and the first end 150. In this mode, the retract chamber is movable volume V4 defined between the third piston head 206 and the second end 152. In such a case, to move in the positive direction (+) the extend chamber (V1) is fluidly connected via the extend supply line 114 to the high pressure line 120 and the retract chamber V4 is fluidly connected by the retract supply line 116 to the low pressure line 122. Alternatively, to move in the retract direction, the extend chamber (V1) is fluidly connected via the extend supply line 114 to the low pressure line 122 and the retract chamber V4 is fluidly connected by the retract supply line 116 to the high pressure line 120. This selection can be done by the control element 118 in a known manner. For example, the control element 118 is configured to control the amount of pressure in each of the retract chamber V4 and the extend chamber V1 to cause translational movement of the piston heads 204, 206 relative to the housing 104 and thus control an extension or retraction of the piston 102.

Relative to the second mode discussed below, the first mode can be low load-high speed mode. In the following discussion, certain shorthand notations are made. First, the second and third pistons 204, 206 can have equal areas and that area can be referred to as A. Further, in the below certain forces are described. Those magnitude of that force will be equal to a pressure within a certain volume multiplied by a piston head area exposed to that pressure. Thus, the pressure move in the + positive direction created by the first piston head is equal to the pressure in V1 times area A. The third piston 206 (and the opposite side of the first piston 204) even if D2=D3, does not, however, present and area A. Rather, it presents a smaller area (B) that is *A minus* the size of the shaft 102. Similarly, the first piston 202 presents area C which is D1 minus the size of the shaft 102.

Consider the case where an extension (e.g., motion in the positive direction is desired). In the first mode, the pressure in V1 is equal to the pressure in the high pressure line 120 (denoted as PC1 below) and the pressure in V4 is equal the pressure in the low pressure line 122 (denoted PC2) below. In the below, the pressure in volumes V2 and V3 are indicated as PV2 and PV3, respectively.

The force produced by the piston in such a state is:

$$F = A*PC1 + C*PV2 + B*PV3 - B*PV2 - C*PV3 - B*PC2 \qquad (1).$$

In the above: A*PC1 is the force in the + direction due to pressure in V1 times area A (the positive contribution due to the second piston 204); C*PV2 is the force in the + direction due to pressure in V2 times area C (the positive contribution due to the first piston 202); B*PV3 is the force in the + direction due to pressure in V3 times area B acting (the positive contribution due to the third piston 206). Similarly, −B*V2 is the force in the − direction due to pressure in V2 times area B (the negative contribution due to the second piston 204 acting again pressure P2); −C*PV3 is the force in the − direction due to pressure in V3 times area C (the negative contribution due to the first piston 202); and −B*PC2 is the force in the − direction due to pressure in V4 (PC2) times area B acting (the negative contribution due to the third piston 206 compressing V4).

Given that PV2=PV3, certain terms can be eliminated as indicated below:

$$F = A*PC1 - B*PC2 \qquad (3)$$

such that force reduces to:

$$F = A*PC1 - B*PC2 \qquad (4).$$

Such a force is in-line with single piston solenoid where the piston has area A.

The system 100 can also operate in a second mode. In this mode, the mode selector 106 is set so that it joins V2 to extend line 114 and V3 to retract line 116 as shown in FIG. 3. This, in effect, "joins" V1 with V2 and V3 with V4. In this configuration, the force produced is basically due to the difference in pressure between the high and low pressure lines 120, 122. In more detail, and with the same nomenclature as above.

$$F = A*PC1 + C*PV2 + B*PV3 - B*PV1 - C*PV2 - B*PC2 \qquad (5)$$

Noting that as configured, PV2=PC1 and PV3=PC2, equation 5 can be reduced to:

$$F = (A - B + C)*PC1 - C*PC2 \qquad (6)$$

As C is larger that A/B it shall be understood that in this configuration more force can be generated than in the first mode.

Based on the above description it shall be understood that a single system can be provided that have two different operational characteristics. In particular, by proving the position 102 with multiple (202, 204, 206) of different sizes the mode switching element 118 configured to switch pressures sources between the heads/volumes allows for the system to control the force output and slew rate capabilities of the system. In particular, in the first mode the small diameter heads on the outside (heads 204, 206) control and allow for fast slew rates at lower force outputs with low flow. Conversely, when in the second mode the larger diameter head (202) controls and allows for greater force output at a reduced slew rate with the same flow. Further, adding a second diameter inside allows for effective gearing of the hydraulic system.

Based on the above, it shall be understood that also disclosed is method. The method can include operating the above system in both the first and second modes. When in the first mode, the piston moves at a first speed and first force and when in the second mode, the piston with a second force that is greater than the first force. In the second mode, the piston can move at a second speed that is slower than the first speed.

Figure 4:
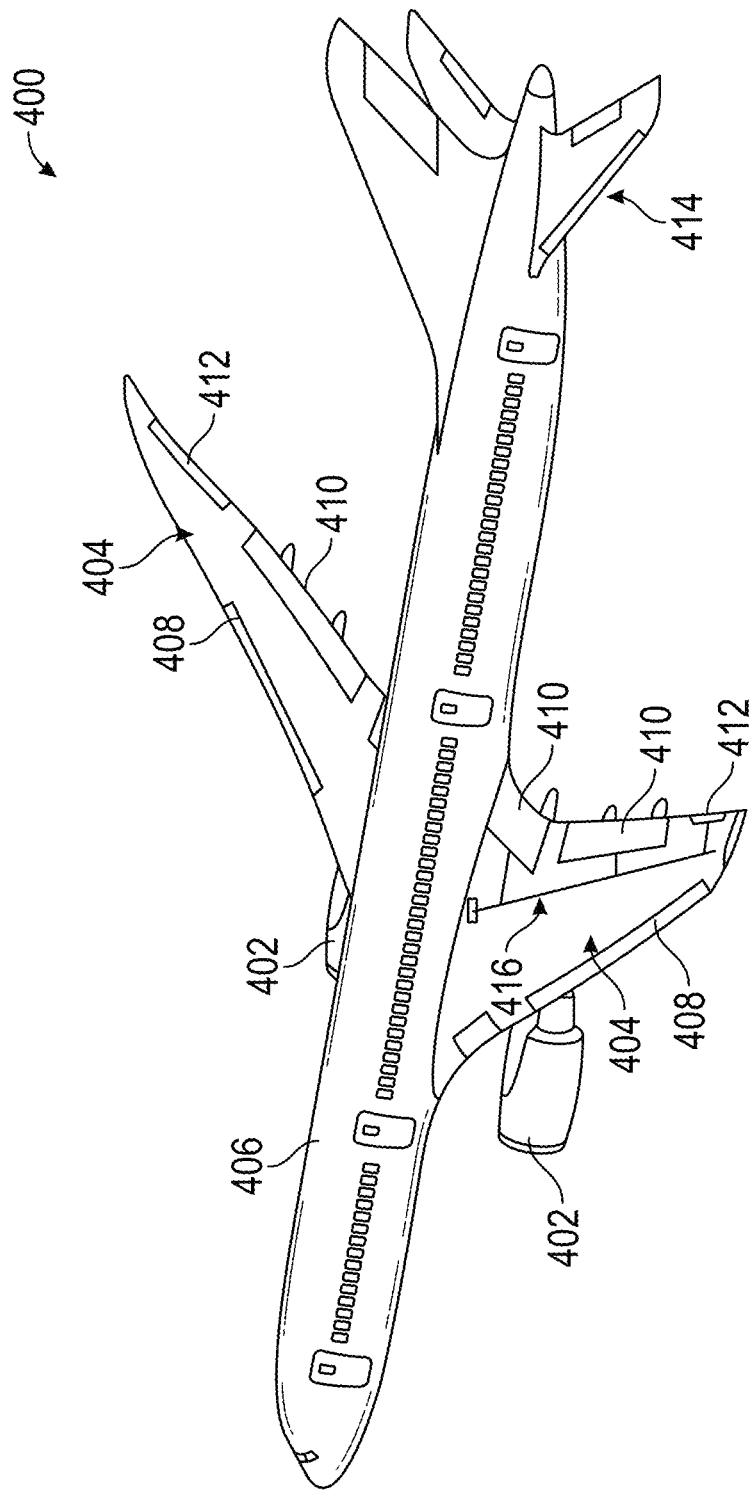
FIG. 4 shows an aircraft on which the systems disclosed herein can be utilized.

FIG. 4 illustrates an example of an aircraft 400 on which various embodiments can be implemented. The illustrated aircraft includes aircraft engines surrounded by (or otherwise carried in) nacelles 402. The aircraft 400 includes wings 404 that extend from an aircraft fuselage 406. Each wing 404 may include one or more slats 408 on a forward edge or leading edge and one or more flaps 410 on an aft, rear, or trailing edge thereof. The wings 404 may also include ailerons 412 on the trailing edges, as will be appreciated by those of skill in the art. The aircraft 400, as shown, includes a tail structure 414 which can include various flaps, ailerons, slats, and the like, as will be appreciated by those of skill in the art. The flaps, slats, ailerons, and the like are generally referred to herein as "aerostructures" or "aerodynamic structures" as they are movable under aircraft power systems and are configured to control flight and motion of the aircraft 400. An actuator system 100 disclosed herein may be connected to one or more of the aerostructures and is illustrated by way of example, by reference numeral 416. For example, each wing 404 and the tail structure 414 may include one or more aerostructure actuator systems 416. The aerostructure actuator systems 416 may be operably connected to the various aerostructures and configured control the operation/position of the aerostructures to control flight of the aircraft 400.

Further, the engines of the aircraft 400 may include various actuators and control mechanisms that can incorporate one or more actuator systems such as shown and described above with respect to FIGS. 1-3. As such, the described actuator systems of the present disclosure may be incorporated into aircraft engine systems and/or aircraft flight systems. It will be appreciated that such actuator systems as described herein may be used for other purposes onboard aircraft, such as for actuating doors, landing gear, or the like.

The terms "about" and "substantially" are intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

What is claimed is:

1. A hydraulic actuator system for an aircraft, the actuator system comprising:
   a hydraulic actuator having a housing with a piston having a piston shaft arranged within the housing,
   wherein the housing is formed to have first, second and third regions, wherein the first region is between the second and third regions and has a larger diameter than the second and third regions;
   first, second, and third piston heads connected to the piston shaft with the first piston head being between the second and third piston, wherein the first piston head is within the first region and divides the first region into two volumes, the second piston head is in the second region and defines a first volume and the third piston head is in the third region and defines a fourth volume, wherein the a second volume is defined between first and second piston heads and a third volume is defined between the first and third piston heads; and
   a mode selection device operably connected to the first, second, third and fourth volume;
   wherein in a first mode the mode selection device connects the second volume to the third volume and in a second mode the mode selection device connects the first volume to the second volume and connects the third volume to the fourth volume.

2. The system of claim 1, wherein the first, second and third regions are cylindrical.

3. The system of claim 2, wherein the first region has a first diameter and second region and third regions have a second diameter that is smaller than the first diameter.

4. The system of claim 1, further comprising an extend line fluidly connected to the second region and a retract line fluidly connected to the third region.

5. The system of claim 4, wherein when in the second mode the second volume is fluidly connected to the extend line and the third volume is fluidly connected to the retract line.

6. The system of claim 5, further comprising:
a control element connected to high pressure source and a low pressure source, wherein the control element selectively couples the high pressure source to the extend line to extend the piston and to the retract line to retract the piston.

7. The system of claim 6, wherein the control element selectively couples the low pressure source to the extend line to retract the piston and to the retract line to extend the piston.

8. The system of claim 7, wherein the control element is an electrohydraulic servovalve.

9. The system of claim 1, further comprising an aircraft system, wherein the piston is configured to actuate a component of the aircraft system.

10. A method of operating an actuator system onboard an aircraft, the method comprising:
providing the system as recited in claim 1;
causing the mode selection device to operate in the first mode to move the piston at a first speed and first force; and
causing the mode selector to operate in the second mode to move the piston with a second force that is greater than the first force.

11. The method of claim 10, wherein when in the second mode, the piston moves at a second speed that is slower than the first speed.

12. The method of claim 10, wherein the first, second and third regions are cylindrical.

13. The method of claim 12, wherein the first region has a first diameter and second region and third regions have a second diameter that is smaller than the first diameter.

14. The method of claim 10, connecting the piston to actuate a component of an aircraft system.

* * * * *